(12) United States Patent
Yang et al.

(10) Patent No.: US 12,183,076 B2
(45) Date of Patent: Dec. 31, 2024

(54) METHOD AND APPARATUS FOR EXTRACTING VIDEO SEGMENT, DEVICE AND STORAGE MEDIUM

(71) Applicant: TENCENT MUSIC ENTERTAINMENT TECHNOLOGY (SHENZHEN) CO., LTD., Shenzhen (CN)

(72) Inventors: Yue Yang, Shenzhen (CN); Zhi Dong, Shenzhen (CN); Shenyuan Li, Shenzhen (CN)

(73) Assignee: TENCENT MUSIC ENTERTAINMENT TECHNOLOGY (SHENZHEN) CO., LTD., Shenzhen (CN)

( * ) Notice: Subject to any disclaimer, the term of this patent is extended or adjusted under 35 U.S.C. 154(b) by 540 days.

(21) Appl. No.: 17/625,696

(22) PCT Filed: Dec. 30, 2019

(86) PCT No.: PCT/CN2019/130174
§ 371 (c)(1),
(2) Date: Jan. 7, 2022

(87) PCT Pub. No.: WO2021/017406
PCT Pub. Date: Feb. 4, 2021

(65) Prior Publication Data
US 2022/0277566 A1 Sep. 1, 2022

(30) Foreign Application Priority Data
Jul. 30, 2019 (CN) .......................... 201910695648.8

(51) Int. Cl.
*G06V 20/40* (2022.01)
*G06V 40/16* (2022.01)

(52) U.S. Cl.
CPC .............. *G06V 20/49* (2022.01); *G06V 20/46* (2022.01); *G06V 40/161* (2022.01)

(58) Field of Classification Search
CPC ...... G06V 10/56; G06V 10/762; G06V 10/82; G06V 20/46; G06V 20/49; G06V 20/635; G06V 40/161
See application file for complete search history.

(56) References Cited

U.S. PATENT DOCUMENTS

2006/0288291 A1 12/2006 Lee et al.
2007/0091203 A1 4/2007 Peker et al.
(Continued)

FOREIGN PATENT DOCUMENTS

CN 101021857 A 8/2007
CN 103150373 A 6/2013
(Continued)

OTHER PUBLICATIONS

International Search Report of the International Searching Authority for State Intellectual Property Office of the People's Republic of China in PCT application No. PCT/CN2019/130174 issued on Apr. 24, 2020, which is an International application corresponding to this U.S. application.

(Continued)

*Primary Examiner* — Michael J Vanchy, Jr.
(74) *Attorney, Agent, or Firm* — Kolitch Romano Dascenzo Gates LLC (57) ABSTRACT

Provided is a method for extracting a video segment, including: acquiring a boundary value of content of a video, wherein the boundary value includes an upper boundary, a lower boundary, a left boundary, and a right boundary; acquiring a plurality of first segments by performing key frame segmentation on the video; detecting an upper boundary of subtitles in each of the plurality of first segments;

(Continued)

detecting a face position in each of the plurality of first segments; selecting, from the plurality of first segments, a second segment in which the face position satisfies a preset condition; and acquiring a third segment without subtitles by cropping the second segment based on an upper boundary of subtitles in the second segment.

20 Claims, 3 Drawing Sheets

(56) References Cited

U.S. PATENT DOCUMENTS

| | | | | |
|---|---|---|---|---|
| 2012/0281139 | A1* | 11/2012 | Zhang | G06T 3/04 |
| | | | | 348/468 |
| 2016/0373829 | A1* | 12/2016 | Ramnani | H04N 17/04 |
| 2018/0173959 | A1 | 6/2018 | Shah et al. | |
| 2018/0174600 | A1 | 6/2018 | Chaudhuri et al. | |
| 2018/0181814 | A1 | 6/2018 | Dong et al. | |
| 2019/0370546 | A1* | 12/2019 | Agarwal | G06V 20/20 |

FOREIGN PATENT DOCUMENTS

| | | |
|---|---|---|
| CN | 103327262 A | 9/2013 |
| CN | 105323634 A | 2/2016 |
| CN | 106162222 A | 11/2016 |
| CN | 103426005 B | 2/2017 |
| CN | 107277557 A | 10/2017 |
| CN | 108882057 A | 11/2018 |
| CN | 109145878 A | 1/2019 |
| CN | 110287949 A | 9/2019 |

OTHER PUBLICATIONS

The State Intellectual Property Office of People's Republic of China, First Office Action in Patent Application No. CN201910695648.8 issued on Feb. 9, 2021, which is a foreign counterpart application corresponding to this U.S. Patent Application, to which this application claims priority.
Notification of Completion of Formalities for Patent Register No. 2021030900116160 issued on Mar. 12, 2021.
Tian, Zhi et al., "Detecting Text in Natural Image with Connectionist Text Proposal Network"; European Conference on Computervision, 2016.
Ruan, Shaohui, et al.; "text-detection-ctpn"; obtained at https://github.com/eragonruan/text-detection-ctpn; Feb. 15, 2019.
Zhang, Kaipeng, et al., "Joint Face Detection and Alignment Using Multitask Cascaded Convolutional Networks"; obtained at IEEE Signal Processing Letters, vol. 23, No. 10; Oct. 2016.
Zhang, Kaipeng, "MTCNN_face-detection_alignment"; obtained at https://github.com/kpzhang93/MTCNN_face_detection_alignment; Aug. 9, 2017.

* cited by examiner

METHOD AND APPARATUS FOR EXTRACTING VIDEO SEGMENT, DEVICE AND STORAGE MEDIUM

CROSS-REFERENCE TO RELATED APPLICATION

This application is a US national stage of international application No. PCT/CN2019/130174, filed on Dec. 30, 2019, which claims priority to Chinese Patent Application No. 201910695648.8, filed on Jul. 30, 2019 and entitled "VIDEO CLIP EXTRACTION METHOD AND APPARATUS, DEVICE, AND STORAGE MEDIUM", the disclosures of which are herein incorporated by reference in their entireties.

TECHNICAL FIELD

The present application relates to the field of multimedia technologies, and in particular, to a method and apparatus for extracting a video segment, a device, and a storage medium.

BACKGROUND

With the development of multimedia technology, videos have become popular and developed as interesting data form. Since duration of a video is usually long, highlights often need to be extracted from the video for appreciation and dissemination.

SUMMARY

Embodiments of the present application provide a method and apparatus for extracting a video segment, a device, and a storage medium. The technical solutions are as follows:

According to one aspect, a method for extracting a video segment is provided. The method includes:
  acquiring a boundary value of content of a video, wherein the boundary value includes an upper boundary, a lower boundary, a left boundary, and a right boundary;
  acquiring a plurality of first segments by performing key frame segmentation on the video;
  detecting an upper boundary of subtitles in each of the plurality of first segments;
  detecting a face position in each of the plurality of first segments;
  selecting, from the plurality of first segments, a second segment in which the face position satisfies a preset condition; and
  acquiring a third segment without subtitles by cropping the second segment based on an upper boundary of subtitles in the second segment.

Optionally, the detecting the upper boundary of the subtitles in each of the plurality of first segments includes:
  extracting a plurality of video frames from each of the plurality of first segments;
  acquiring subtitle positions in the plurality of video frames by inputting the plurality of video frames into a subtitle detection model, wherein the subtitle detection model is configured to detect a subtitle position in a video frame; and
  acquiring the upper boundary of the subtitles in the first segment based on the subtitle positions in the plurality of video frames.

Optionally, the extracting the plurality of video frames from each of the plurality of first segments includes:
  acquiring a time point of each line of lyrics in the video from a lyric file of the video; and
  extracting a video frame corresponding to the time point from the first segment.

Optionally, upon acquiring the subtitle positions in the plurality of video frames by inputting the plurality of video frames into the subtitle detection mode, the method further includes:
  acquiring a plurality of clusters by clustering the subtitle positions in the plurality of video frames; and
  deleting, from the subtitle positions in the plurality of video frames, subtitle positions that do not belong to any one of the clusters.

Optionally, prior to acquiring the subtitle positions in the plurality of video frames by inputting the plurality of video frames into the subtitle detection model, the method further includes:
  acquiring a first sample image and characters;
  generating a second sample image based on the first sample image and the characters, wherein the second sample image contains subtitles; and
  acquiring the subtitle detection model by training a model by using the second sample image.

Optionally, the selecting, from the plurality of first segments, the second segment in which the face position satisfies the preset condition includes at least one of:
  acquiring a face position score based on the face position in the first segment and selecting the second segment based on the face position score, wherein the face position score represents a centering degree of a face position in a video frame; and
  acquiring face size score based on the face position in the first segments and selecting the second segment based on the face size score, wherein the face size score represents an appropriateness degree of a face size relative to a size of the video frame.

Optionally, the selecting, from the plurality of first segments, the second segment in which the face position satisfies the preset condition includes any one of:
  acquiring a score of the first segment based on the face position score and the face size score and selecting a first segment of which the score is greater than a first threshold as the second segment;
  selecting a first segment of which the face position score is greater than a second threshold as the second segment; and
  selecting a first segment of which the face size score is greater than a third threshold as the second segment.

Optionally, the acquiring the plurality of first segments by performing the key frame segmentation on the video includes:
  detecting key frames in the video, wherein the key frame is a video frame in which a shot change occurs; and
  acquiring the plurality of first segments by segmenting the video using the key frames as segmentation points.

Optionally, the detecting the key frames of the video includes:
  acquiring a color histogram of each of a plurality of video frames of the video;
  classifying the plurality of video frames into a plurality of types based on the color histogram of each of the plurality of video frames, wherein a difference between color histograms of any two video frames of a same type is less than a preset threshold; and
  selecting a first frame of each type in the plurality of types as a key frame corresponding to the type.

Optionally, the acquiring the color histogram of each of the plurality of video frames of the video includes:

acquiring a first histogram of a first region in the video frame, wherein the first region is a region in a center of a view field of the video frame;

acquiring a second histogram of a second region in the video frame, wherein the second region is a region at an edge of the view field of the video frame; and acquiring the color histogram by performing weighted average on the first histogram and the second histogram based on a first weight of the first region and a second weight of the second region, wherein the first weight is greater than the second weight.

Optionally, prior to performing the key frame segmentation on the video, the method further includes:

deleting a border of the video based on the boundary value.

Optionally, the acquiring the boundary value of the content of the video includes:

traversing any video frame of the video from a center of the video frame to a periphery of the video frame; and in response to value differences between different pixels in any currently traversed row falling within a preset range, determining the row as an upper or lower boundary of the content of the video frame; and/or in response to value differences between different pixels in any currently traversed column falling within the preset range, determining the column as a left or right boundary of the content of the video frame.

Optionally, the acquiring the boundary value of the content of the video includes:

acquiring boundary values of content of a plurality of video frames of the video;

acquiring a plurality of clusters by clustering the boundary values of the content of the plurality of video frames; and deleting, from the boundary values of the content of the plurality of video frames, boundary values that do not belong to any cluster.

According to another aspect, a computer device is provided. The computer device includes at least one processor and at least one memory storing at least one instruction, wherein the at least one processor, when loading and executing the at least one instruction, is caused to perform the foregoing method for extracting the video segment.

According to another aspect, a computer-readable storage medium is provided. The storage medium stores at least one instruction. The at least one instruction, when loaded and executed by a processor, causes the processor to perform the foregoing method for extracting the video segment.

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following description show merely some embodiments of the present application, and those of ordinary skill in the art may still derive other drawings from these accompanying drawings without creative efforts.

DETAILED DESCRIPTION

To make the objective, technical solutions, and advantages of the present application clearer, embodiments of the present application are further described in detail with reference to the accompanying drawings.

In the related art, video segments are usually extracted manually. A user uses video clip software to extract a video segment by taking a clipping start position as a start point and a clipping end position as an end point. Such video segment extraction method involves cumbersome operations and has low efficiency, and it can be difficult to extract highlights from videos.

In an exemplary application scenario, the embodiments of the present disclosure may be applied to a scenario of extracting highlights from a music video (MV). MVs usually feature many scene changes, few long shots, and many celebrities at a same time period, and contain solid-color borders. MVs are often accompanied by subtitles, and subtitles are often added to the MVs during post-production. The method provided in the embodiments can automatically extract video segments with a uniform resolution, an appropriate face size, and a centered face position, and without solid-color borders and subtitles from various MVs. Apparently, MVs are merely an example of videos. In other possible embodiments, the embodiments may also be applied to scenarios of extracting segments from other types of videos, such as short videos and micro movies. The video type is not limited in the embodiments.

Figure 1:
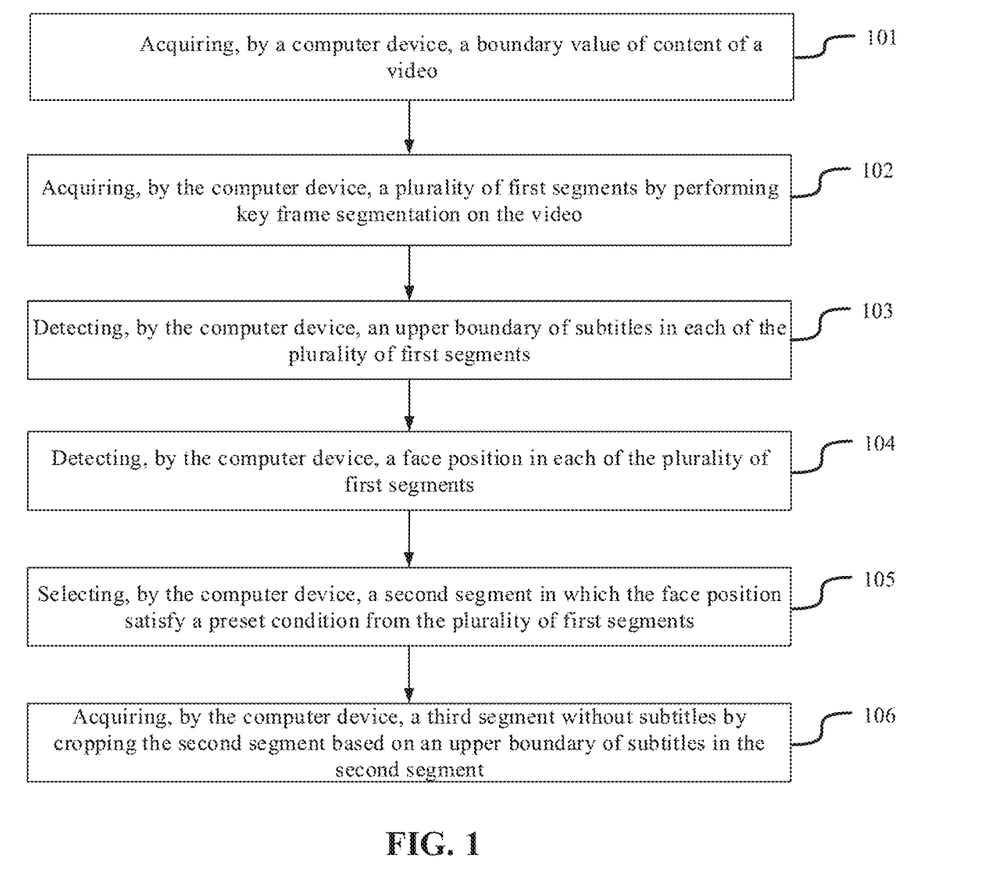
FIG. 1 is a flowchart of a method for extracting a video segment according to some embodiments of the present application.

FIG. 1 is a flowchart of a method for extracting a video segment according to some embodiments of the present application. The method in this embodiment is performed by a computer device. Referring to FIG. 1, the method includes the following steps:

In step 101, a boundary value of content of a video is acquired by the computer device.

The boundary value includes an upper boundary, a lower boundary, a left boundary, and a right boundary. The upper boundary and the lower boundary may be represented by ordinates, and the left boundary and the right boundary may be represented by abscissas. In some possible embodiments, the boundary value of the content of the video may be represented by point coordinates of the four boundaries, for example, represented by $(x_1, x_2, y_1, y_2)$, wherein $x_1$ represents the left boundary, $x_2$ represents the right boundary, $y_1$ represents the upper boundary, and $y_2$ represents the lower boundary. In some other possible embodiments, the boundary value of the content of the video may alternatively be represented by point coordinates of a specific corner and a width and height of the content, for example, represented by $(x_i, y_i, w_i, h_i)$, wherein $x_i$ represents an abscissa of an upper-left corner, $y_i$ represents an ordinate of the upper-left corner, $w_i$ represents the width, and $h_i$ represents the height.

In a possible implementation, step 101 may specifically include: a plurality of video frames of the video may be extracted. The computer device traverses any video frame of the video from a center of the video frame to a periphery of the video frame; and determines whether value differences between different pixels in any currently traversed row fall within a preset range. In response to the value differences between the different pixels in the row falling within the preset range, the computer device stops the traversal and determines the row as an upper or lower boundary of content of the video frame. In response to the value differences between the different pixels in the row not falling within the preset range, the computer device continues to traverse a next row until value differences between different pixels in a traversed row fall within the preset range. Each row includes a plurality of pixels, and different pixels in a same row have a same ordinate but different abscissas.

Similarly, the computer device determines whether value differences between different pixels in any currently traversed column fall within the preset range. In response to the value differences between the different pixels in the column falling within the preset range, the computer device stops the traversal and determines the column as a left or right boundary of the content of the video frame. In response to the value differences between the different pixels in the column not falling within the preset range, the computer device continues to traverse a next column until value differences between different pixels in a traversed column fall within the preset range. Each column includes a plurality of pixels, and different pixels in a same column have a same abscissa but different ordinates.

Value differences between the different pixels in the same row are value differences between the different pixels in the same row in three channels. Specifically, the pixel differences include a value difference between the different pixels in the same row in a red channel, a value difference between the different pixels in the same row in a green channel, and a value difference between the different pixels in the same row in a blue channel. Similarly, value differences between the different pixels in the same column are value differences between the different pixels in the same column in the three channels. Specifically, the pixel differences include a value difference between the different pixels in the same column in the red channel, a value difference between the different pixels in the same column in the green channel, and a value difference between the different pixels in the same column in the blue channel.

The preset range of the value differences may be set based on experiments, experience, or requirements. For example, the preset range may be 5. The preset range may be prestored in the computer device.

In a process of extracting the video frames, considering that positions of borders of the plurality of video frames of the same video are usually the same, the plurality of frames may be uniformly extracted from the video, and the boundary value of the content of the video may be acquired based on the extracted frames. In an example, three to five frames may be extracted.

Optionally, after acquiring the boundary value of the content of the video, the computer device may delete the border of the video based on the boundary value. Specifically, the computer device may delete parts outside the boundaries of the content of the video based on the boundary value, for example, delete a part above the upper boundary, a part below the lower boundary, a part to the left of the left boundary, and a part to the right of the right boundary, so as to delete the border of the video. The border of the video may be around or at the edge of the content of the video when the video is played, for example, may be letter boxes of the video. Generally, the border of the video is a region added to the video during post-production to make the video have a uniform resolution. Deleting the solid-color border before a video segment is extracted can prevent the border of the video from affecting a visual effect of the extracted video segment, to improve quality of the video segment.

In some possible embodiments, after acquiring a boundary value of content of each of the plurality of video frames, the computer device may cluster the boundary values of the content of the plurality of video frames to acquire a plurality of clusters; and delete boundary values that do not belong to any one of the clusters from the boundary values of the content of the plurality of video frames, and perform subsequent steps based on remaining boundary values, for example, delete the border of the video based on the remaining boundary values. In this way, abnormal boundary values can be deleted, for example, boundary values of some video frames with a same background color, to ensure accuracy of the acquired boundary values.

Figure 2:
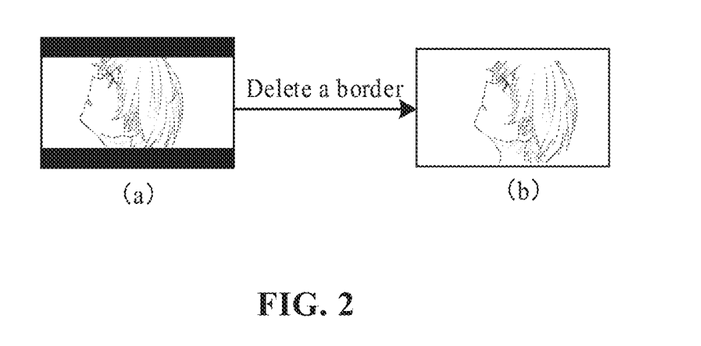
FIG. 2 is a schematic diagram of deleting a border of a video according to some embodiments of the present application.

For example, FIG. 2 is a schematic diagram of effects before and after a border of a video is deleted. FIG. 2(a) shows an original video. There are two letter boxes at top and bottom of the video. After step 101 is performed, a video shown in FIG. 2(b) is acquired. As shown in FIG. 2(b), the letter boxes at the top and bottom of the video are deleted after performing step 101.

Apparently, the step of deleting the border is optional. In some other possible embodiments, if the video contains no border, the step of deleting the border may not be performed. In addition, performing step 101 first is merely an example of a sequence of step 101. Step 101 may alternatively be performed after another step. The sequence of performing step 101 is not limited in this embodiment.

In step 102, a plurality of first segments are acquired by performing key frame segmentation on the video.

The first segments are segments acquired after the video is segmented. In some possible embodiments, a process of segmenting the video may include the following steps 1 and 2:

In step 1, key frames of the video are detected by the computer device.

The key frame is a video frame in which a shot change occurs. Specifically, a key frame of a first shot of the video may be a first frame of the video. A key frame of any shot in a second shot to a last shot of the video may be a frame between two shots. A previous frame of the key frame may be a last frame of a previous shot, and the key frame may be a first frame of the next shot.

In step (1), a color histogram of each of the plurality of video frames of the video is acquired by the computer device.

In some possible embodiments, the computer device may use hue, saturation, and value (HSV) color space to acquire the color histogram of each video frame. Numbers of bins of three channels of the color histogram may be set based on sensitivity of a human eye. In an example, a ratio of the numbers of bins of the hue (H) channel, saturation (S) channel, and value (V) channel may be set to 16:4:4.

In some possible embodiments, step (1) may include the following steps (1.1) to (1.3):

In step (1.1), a first histogram of a first region in the video frame is acquired by the computer device.

The first region is a region in a center of a view field of the video frame. In some possible embodiments, the first region may be an elliptical region to simulate a shape of the view field. For example, the first region may be an elliptical region that is in the center of the video frame and occupies 75% of an area of the video frame.

In step (1.2), a second histogram of a second region in the video frame is acquired by the computer device.

The second region is a region at an edge of the view field of the video frame. In some possible embodiments, the second region may be a region other than the first region in the video frame.

In step (1.3), the color histogram is acquired by performing weighted average by the computer device on the first histogram and the second histogram based on a first weight of the first region and a second weight of the second region.

The first weight is a weight of the first region, the second weight is a weight of the second region, and the first weight may be greater than the second weight. The histogram of the first region and the histogram of the second region may be merged into one histogram through weighted average.

In step (2), the plurality of video frames are classified by the computer device into a plurality of types based on the color histogram of each of the plurality of video frames.

A difference between color histograms of any two video frames of a same type is less than a preset threshold. Video frames of one type may include at least one video frame of a same shot.

In some possible embodiments, for any video frame, the computer device may acquire a difference between a color histogram of the video frame and a color histogram of a closest video frame in which a shot change occurs before the video frame, and determine whether the difference is less than the preset threshold to determine whether a shot change occurs in the video frame.

Specifically, the computer device may traverse the plurality of video frames from the first video frame, compare a color histogram of a currently traversed $i^{th}$ video frame with the color histogram of the first video frame to acquire a difference between the two color histograms, and determine whether the difference exceeds the preset threshold. If the difference exceeds the preset threshold, the color histogram of the $i^{th}$ video frame suddenly changes. In other words, a shot change occurs in the $i^{th}$ video frame. The first video frame to an $(i-1)^{th}$ video frame are used as video frames of the first shot, and video frames of a first type are the first video frame to the $(i-1)^{th}$ video frame. Wherein i is a positive integer.

Then, the $i^{th}$ video frame is used as a first video frame of the second shot. From the $i^{th}$ video frame, the computer device may compare a color histogram of a currently traversed $k^{th}$ video frame with the color histogram of the $i^{th}$ video frame to acquire a difference between the two color histograms, and determine whether the difference exceeds the preset threshold. If the difference exceeds the preset threshold, the $i^{th}$ video frame to a $(k-1)^{th}$ video frame are used as video frames of the second shot, and video frames of a second type are the $i^{th}$ video frame to the $(k-1)^{th}$ video frame. Wherein k is a positive integer, and k is greater than i.

Next, the $k^{th}$ video frame is used as a first video frame of a third shot, and so on. Each time a shot change is detected in a currently traversed video frame, a color histogram comparison benchmark may be updated to cluster shot changes and classify each video frame in which no shot change occurs as a same type.

In some possible embodiments, for any video frame, if the difference between the color histogram of the video frame and the color histogram of the closest video frame in which the shot change occurs before the video frame is greater than the preset threshold, the video frame may be used as a candidate frame. The computer device may acquire a color histogram of a next video frame of the video frame, acquire a difference between the color histogram of the next video frame and the color histogram of the closest video frame in which the shot change occurs, and determine whether the difference is greater than the preset threshold. If the difference is less than or equal to the preset threshold, the candidate frame may not be used as a video frame in which a shot change occurs. If the difference is greater than the preset threshold, comparison may be performed for a video frame after the next video frame, or the candidate frame may be directly used as the video frame in which the shot change occurs. By analogy, a preset number of video frames after the candidate frame may be traversed. If a difference between a color histogram of each video frame in the preset number of video frames and the color histogram of the closest video frame in which the shot change occurs is greater than the preset threshold, that is, a plurality of consecutive video frames have a sudden change in the color histogram relative to the closest video frame in which the shot change occurs, the candidate frame may be used as the video frame in which the shot change occurs.

In this way, a fault tolerance mechanism is added while the key frames are detected. Even if there is a video frame with a random sudden change in the color histogram in the video, detecting whether color histograms of consecutive video frames after the video frame all suddenly change can avoid mistakenly detecting the video frame with the random sudden change in the color histogram as a key frame, to ensure the accuracy of the detected key frames.

In step (3), a first frame of each type in the plurality of types is selected by the computer device as a key frame corresponding to the type.

Figure 3:
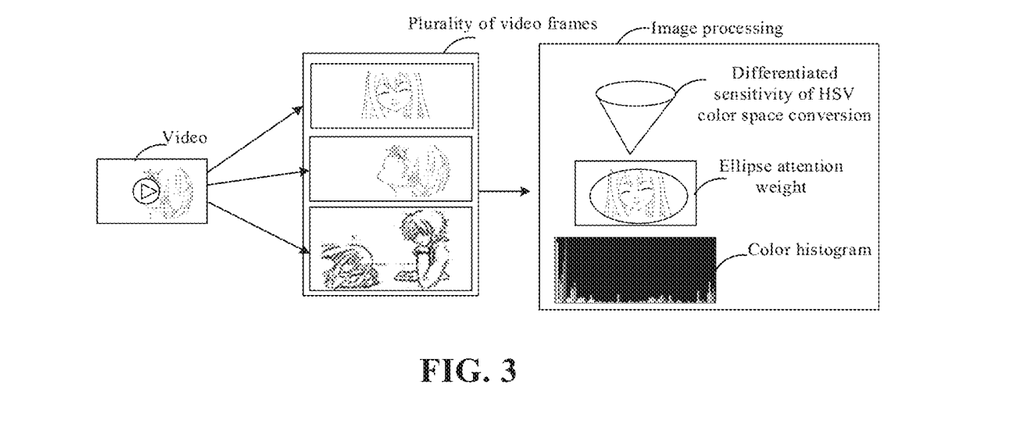
FIG. 3 is a schematic diagram of detecting key frames according to some embodiments of the present application.

For example, FIG. 3 is a schematic diagram of detecting the key frames. The plurality of video frames may be first extracted from the video. The ratio of the numbers of HSV bins of each video frame may be set based on the sensitivity of the human eye. An elliptical region in the center of the video frame is used as a focus region and is allocated a larger weight. A color histogram of the video frame is acquired by performing weighted average.

In step 2, the plurality of first segments are acquired by segmenting the video by the computer device by using the key frames as segmentation points.

The video is segmented by using the key frames as the segmentation points, and each key frame may be a first frame of the first segment.

In some possible embodiments, after the plurality of first segments are acquired, first segments whose duration is less than first duration may be deleted, that is, segments that are too short may be deleted such that first segments whose duration is not less than the first duration are used to subsequently detect an upper boundary of subtitles. In addition, for a first segment whose duration is greater than second duration, a segment of third duration of the first segment may be extracted and used to subsequently detect the upper boundary of the subtitles. The first duration, the second duration, and the third duration may be set based on experience or requirements. For example, the first duration may be 2 seconds, the second duration may be 5 seconds, and the third duration may be 5 seconds. In a possible implementation, the plurality of first segments may be sorted based on duration for a type of a key frame of each first segment. In a sorting result, the first segments whose duration is less than the first duration are deleted, and first segments whose duration is greater than the second duration are selected for extraction.

In step 103, an upper boundary of subtitles in each of the plurality of first segments is detected by the computer device.

This embodiment provides a subtitle avoidance method based on subtitle detection. The upper boundary of the subtitles in the segment is detected, and the segment is acquired based on the upper boundary of the subtitles such that the subtitles can be avoided in the finally acquired segment, so as to acquire a highlight that contains no subtitle. In some possible embodiments, a process of detecting the subtitles may include the following steps (1) to (3):

In step (1), a plurality of video frames are extracted by the computer device from each of the plurality of first segments.

In some possible embodiments, the computer device may acquire a lyric file of the video, and the computer device may acquire a time point of each line of lyrics in the video from the lyric file of the video. The computer device may extract a video frame corresponding to the time point of each line of lyrics from the first segment. In an example, a middle moment of each line of lyrics may be acquired, and a video frame corresponding to the middle moment may be extracted. The middle moment of each line of lyrics may be an average value between a start moment and an end moment of the line of lyrics. The lyric file may be a QRC file, which is a lyric file whose extension is qrc and can be synchronously displayed in a music player. The QRC file can be used to implement the function of Karaoke, and displayed lyrics can be accurately positioned word by word such that synchronous display of the lyrics is more accurate, to resolve a problem of inaccurate lyric display of traditional LRC files.

In this implementation, a video frame in which subtitles appear in a video, such as an MV, is usually a video frame in which lyrics are located. Extracting the video frames from the video based on the time point of each line of lyrics in the lyric file can ensure that each video frame that contains subtitles is extracted, and avoid that some video frames that contain subtitles are not extracted and video frames that contain no subtitles are extracted, to improve the accuracy.

In step (2), a subtitle detection model is called by the computer device, the plurality of video frames are input into the subtitle detection model, and subtitle positions in the plurality of video frames are output.

The subtitle detection model is used to detect a subtitle position in a video frame. The subtitle detection model may be a deep learning-based object detection model. For example, the subtitle detection model may be, but not limited to, a region-based convolutional neural network (R-CNN), a fast R-CNN, and a faster R-CNN. The subtitle detection model may include a long short-term memory (LSTM) module or a bidirectional LSTM module. In an example, considering that subtitles usually have a standard text size and appear in sequence, a connectionist text proposal network (CTPN) model may be selected as the subtitle detection model. The CPTN model is a model that combines the faster R-CNN with the LSTM module.

In some possible embodiments, the subtitle detection model may be acquired by training a model in advance. Specifically, a process of training the model may include the following steps (2.1) to (2.3):

In step (2.1), a first sample image and characters are acquired by the computer device.

In step (2.2), a second sample image is generated by the computer device based on the first sample image and the characters, wherein the second sample image contains subtitles.

In some possible embodiments, a method of adding subtitles to images that contain no subtitles may be used to construct a set of sample images that contain subtitles. To distinguish description, an original sample image is referred to as the first sample image, and an image generated by using the first sample image is referred to as the second sample image. The first sample image may contain no subtitle. Characters of different fonts may be acquired. For example, characters of the following five fonts may be acquired: simplified Chinese, traditional Chinese, English, Japanese, and Korean. The characters may be added to the first sample image to generate the second sample image. A character of any size may be randomly added to the first sample image to acquire the second sample image. A character of any color may be randomly added to the first sample image to acquire the second sample image. A combination of different characters may be added to the first sample image to acquire the second sample image. In an exemplary embodiment, there may be a plurality of first sample images. 100,000 second sample images that contain different combinations of characters of different sizes and colors may be randomly generated based on the plurality of first sample images and the characters.

In step (2.3), the subtitle detection model is acquired by training the model by the computer device by using the second sample image.

In some possible embodiments, after the subtitle position in each video frame is extracted, mistakenly detected subtitle positions may be deleted through clustering. Specifically, the subtitle positions in the plurality of video frames may be clustered to acquire a plurality of clusters. Subtitle positions that do not belong to any cluster are deleted from the subtitle positions in the plurality of video frames. In an example, density-based spatial clustering of applications with noise (DBSCAN) may be used for clustering.

Figures 4, 5:
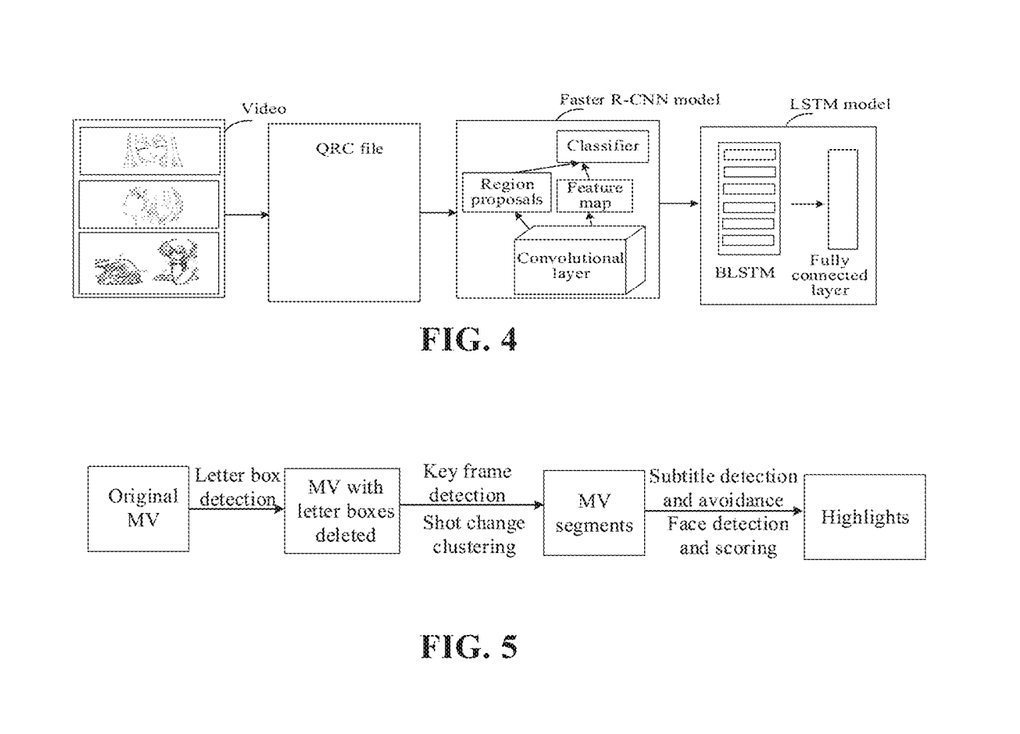
FIG. 4 is a schematic diagram of detecting subtitles according to some embodiments of the present application.
FIG. 5 is a flowchart of extracting highlights according to some embodiments of the present application.

For example, FIG. 4 is a schematic diagram of the subtitle detection. The plurality of video frames that contain the subtitles in the video may be acquired based on the video and the QRC file of the video. The plurality of video frames may be input into the faster R-CNN, and an output result may be input into the LSTM model. The subtitle positions in the video frames are output.

In step (3), the upper boundary of the subtitles in the first segment is acquired by the computer device based on the subtitle positions in the plurality of video frames.

For example, a highest position may be selected from the subtitle positions in the plurality of video frames as the upper boundary of the subtitles in the first segment.

In step 104, a face position in each of the plurality of first segments is detected by the computer device.

In some possible embodiments, the computer device may extract at least one video frame from each of the plurality of first segments, call a face detection model, input the at least one video frame into the face detection model, output a face position in the at least one video frame, and acquire an average value of the face position in the at least one video frame as the face position in the first segment. If there are a plurality of faces in the video frame, a position of each face may be detected, and a position of a largest face may be selected from the positions of the plurality of faces as the face position in the video frame. In addition, a method of extracting two frames per second may be used to extract the video frames from the first segment.

The face position may be represented by a bounding box. The bounding box is a border that surrounds an object and needs to be solved in an object detection problem. The bounding box may be denoted as a set of point coordinates, for example, denoted as point coordinates of an upper-left corner of the bounding box, a width of the bounding box, and a height of the bounding box. For example, the bounding box may be denoted as $(x_i, y_i, w_i, h_i)$, wherein $x_1$ represents an abscissa of the upper-left corner of the bounding box, $y_i$ represents an ordinate of the upper-left corner of the bounding box, $w_i$ represents the width of the bounding box, and $h_i$ represents the height of the bounding box.

The face detection model is used to detect a face position in a video frame. The face detection model may be a CNN. For example, the face detection model may be a multi-task cascaded CNN (MTCNN). The MTCNN may be generated based on a three-stage cascaded CNN and an online negative sample generation strategy. The MTCNN may be used for face detection and alignment. The MTCNN can transmit more than 100 frames per second on a P40 graphics processing unit (GPU).

In some possible embodiments, the computer device may acquire a number of video frames that contain faces in each of the plurality of first segments based on a result of detecting the video frames of the first segment by the face detection model, acquire a percentage of the number of the video frames that contain the faces in a total number of the video frames of the first segment, and determine whether the percentage exceeds a preset percentage. If the percentage exceeds the preset percentage, the first segment is selected. If the percentage does not exceed the preset percentage, the first segment is filtered out. The preset percentage may be set based on experience, experiments, or requirements. For example, the preset percentage may be 50%.

In step 105, second segments in which face positions satisfy a preset condition are selected by the computer device from the plurality of first segments.

The second segments are first segments in which face positions satisfy the preset condition, for example, may be first segments in which face positions are centered and face sizes are appropriate. Specifically, the computer device may select the second segments by executing any one or a combination of the following first and second implementations.

In the first implementation, the computer device acquires face position scores based on face positions in the first segments and selects the second segments based on the face position scores.

The face position score represents a centering degree of a face position in a video frame. A higher face position score indicates that the face position is more centered in the video frame. A mapping relationship between the face position and the face position score may be established. The face position score may be acquired by calculating face position by using the mapping relationship.

In some possible embodiments, the computer device may acquire the cropping parameters based on the boundary value of the content of the video acquired in step 101, the upper boundary of the subtitles acquired in step 103, the face position acquired in step 104 and a target resolution, and acquire the face position score based on the face position and the cropping parameters.

The cropping parameters are used to spatially crop the video frame and indicate a position of a region cropped from the video frame. For example, the cropping parameters may be point coordinates of four boundaries of the cropped region. For another example, the cropping parameter may be point coordinates of a vertex of the cropped region, a width of the region, and a height of the region. The target resolution is used to normalize resolutions of the first segments to ensure that resolutions of the finally acquired video segments are uniform and are all the target resolutions. The target resolution may be set based on requirements or experience. The target resolution may be prestored in the computer device. The target resolution may be preset.

In an example, the cropping parameters may be acquired by using the following formulas (1) to (4):

$$x_{icrop} = \text{int}(x_i + w_i/2 - w_{icrop}/2) \tag{1}$$

$$y_{icrop} = y_0 \tag{2}$$

$$h_{icrop} = \min(y_{icsub} - y0, h0) \tag{3}$$

$$w_{icrop} = \text{int}(w_{out}/h_{out} * h_{icrop}) \tag{4}$$

wherein $x_{icrop}$, $y_{icrop}$, $h_{icrop}$, and $w_{icrop}$ represent the cropping parameters, $x_{icrop}$ represents an abscissa of an upper-left corner of the video frame of the acquired segment, $y_{icrop}$ represents an ordinate of the upper-left corner of the video frame of the acquired segment, $h_{icrop}$ represents a height of the video frame of the acquired segment, $h_{icrop}$ is greater than 0, $w_{icrop}$ represents a width of the video frame of the acquired segment, $w_{icrop}$ is greater than 0, $w_{out}$ represents a number of horizontal pixels in the target resolution, $h_{out}$ represents a number of vertical pixels in the target resolution, $w_{out}$ and $h_{out}$ are positive integers, $x_i$ represents the abscissa of the bounding box corresponding to the face position, $w_i$ represents the width of the bounding box corresponding to the face position, int represents a rounding operation, and min represents a minimum value.

In some possible embodiments, when $x_i + w_i/2 = w_{icrop}/2$ and $y_i + h_i/2 = h_{icrop}/2$, the face position score may be the maximum value or the highest.

In the second implementation, the computer device acquires face size scores based on the face positions in the first segments and selects the second segments based on the face size scores.

The face size score represents an appropriateness degree of a face size relative to a size of the video frame. A higher face size score indicates that the face size is more appropriate relative to the size of the video frame. A mapping relationship between the face size and the face size score may be established. The face size score is acquired by calculating the face size by using the mapping relationship.

In some possible embodiments, the computer device may acquire cropping parameters based on the boundary value of the content of the video acquired in step 101, the upper boundary of the subtitles acquired in step 103, the face position acquired in step 104 and a target resolution, and acquire the face size score based on the face position and the cropping parameters. For example, when $w_i = h_{icrop}/3$, the face size score may be the highest. $w_i$ represents the width of the bounding box corresponding to the face position, and $h_{icrop}$ represents a height of the video frame in the acquired segment.

In some possible embodiments, the implementation of selecting the second segments may include: the computer device acquires scores of the first segments based on the face position scores and the face size scores, compares the score of each first segment with a first threshold, and acquires the second segments by selecting first segments whose scores are greater than the first threshold. The score is used to indicate an overall appropriateness degree of the face position and the face size. The first threshold may be set based on experience, experiments, or requirements. The first threshold may be prestored in the computer device. For example, the first threshold may be 0.35.

Weights may be set for the face position score and the face size score. The score of the first segment is acquired by performing weighted summation on the face position score and the face size score based on the weights of the face position score and the face size score. In an example, the following formula (5) may be used to calculate the score of the first segment:

$$s = \alpha s_1 + (1-\alpha)s_2 \qquad (5)$$

wherein s represents the score, $s_1$ represents the face position score, $\alpha$ represents the weight of the face position score, $s_2$ represents the face size score, $(1-\alpha)$ represents the weight of the face size score, and $\alpha$ is greater than or equal to 0 and less than or equal to 1.

In the foregoing implementation, the face position and face size in the video can be comprehensively considered, and first segments with an inappropriate face position and face size can be filtered out of the first segments of the video to ensure that face positions in finally selected segments are centered, and face sizes are appropriate.

It should be noted that the implementation of considering both the face position and the face size is optional. In some possible embodiments, the face position may be considered, but the face size may not be considered. The face position score is compared with a second threshold. First segments whose face position scores are greater than the second threshold are selected to acquire the second segments. In this way, first segments with inappropriate face positions can be filtered out to ensure that the face positions in the finally selected segments are centered. Alternatively, the face size may be considered, but the face position may not be considered. The face size score is compared with a third threshold. First segments whose face size scores are greater than the third threshold are selected to acquire the second segments. In this way, first segments with inappropriate face sizes can be filtered out to ensure that the face sizes in the finally selected segments are appropriate.

In step 106, a third segment without subtitles is acquired by cropping the second segment by the computer device based on an upper boundary of subtitles in the second segment.

The third segment is a segment cropped from the second segment. In some possible embodiments, the computer device may sort the second segments in descending order of scores of the second segments, and crop the sorted second segments based on cropping parameters corresponding to the upper boundary of the subtitles to acquire the third segments. In a possible implementation, fast-forward Moving Picture Experts Group (FFmpeg), a multimedia video processing tool, may be used for cropping based on the cropping parameters $x_{icrop}$, $y_{icrop}$, $h_{icrop}$, and $w_{icrop}$ in the first implementation in step 105.

In some possible embodiments, after the third segments are acquired, the third segments may be output as highlights.

In some other possible embodiments, the method provided in this embodiment may be used to acquire a highlight collection. The highlight collection may be provided to users as a short video. Specifically, after steps 101 to 106 are performed, a plurality of third segments are acquired. The plurality of third segments may be spliced. The plurality of third segments after the splicing are the highlight collection or short video. The plurality of third segments may be spliced based on preset duration. Total duration of the highlight collection or short video after the splicing does not exceed the preset duration. A plurality of third segments whose duration is less than the preset duration may be merged, or third segments whose duration is greater than the preset duration may be segmented. The preset duration may be set based on requirements, experience, or experiments. For example, the preset duration may be 10 seconds.

In some possible embodiments, various post-processing may be performed on the output highlight collection or short video. For example, the output highlight collection or short video may be displayed as a dynamic background, or uploaded, shared, and published. A post-processing method is not limited in this embodiment.

For example, the video is an MV. FIG. 5 is a flowchart of extracting highlights from the MV. After an original MV is acquired, step 101 may be performed to detect and delete letter boxes of the MV to acquire an MV with the letter boxes deleted. Step 102 may be performed to detect key frames of the MV and classify a plurality of video frames between two shot changes as one type. Step 103 may be performed to detect an upper boundary of subtitles in the MV to avoid subtitles. Step 104 may be performed to perform face detection and filter out segments in which a face position and size do not satisfy requirements based on face position scores and face size scores, to finally acquire the highlights.

This embodiment provides a method that can automatically extract highlights from a video. The video is segmented to acquire the plurality of segments, a face detection method is used for face detection, and a subtitle detection method is used to detect the upper boundary of the subtitles. In the finally acquired segments, the face positions satisfy requirements, the subtitles in the video can be avoided, a display effect is good, cumbersome operations of users are prevented, and the efficiency of extracting segments is improved.

All the foregoing optional technical solutions can be arbitrarily combined to form optional embodiments of the present application, which are not described one by one herein.

Figure 6:
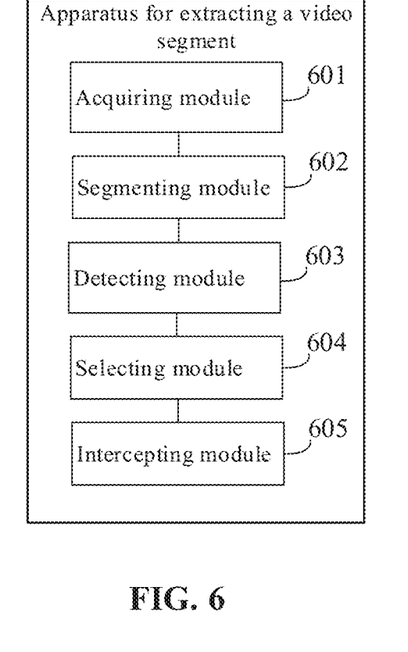
FIG. 6 is a schematic structural diagram of an apparatus for extracting a video segment according to some embodiments of the present application.

FIG. 6 is a schematic structural diagram of an apparatus for extracting a video segment according to some embodiments of the present application. As shown in FIG. 6, the apparatus includes: an acquiring module 601, configured to acquire a boundary value of content of a video, wherein the boundary value includes an upper boundary, a lower boundary, a left boundary, and a right boundary; a segmenting module 602, configured to acquire a plurality of first segments by performing key frame segmentation on the video; a detecting module 603, configured to detect an upper boundary of subtitles and a face position in each of the plurality of first segments; a selecting module 604, configured to select, from the plurality of first segments, a second segment in which the face position satisfies a preset condition; and an intercepting module 605, configured to acquire a third segment without subtitles by intercepting the second segment based on an upper boundary of subtitles in the second segment.

Optionally, the detecting module 603 may include: an extracting submodule, configured to extract a plurality of video frames from each of the plurality of first segments; a subtitle detecting model, configured to acquire subtitle positions in the plurality of video frames by inputting the plurality of video frames into a subtitle detection model, wherein the subtitle detection model is configured to detect a subtitle position in a video frame; and a determining submodule, configured to acquire the upper boundary of the subtitles in the first segment based on the subtitle positions in the plurality of video frames.

Optionally, the extracting submodule may be configured to acquire a time point of each line of lyrics in the video from a lyric file of the video; and extract a video frame corresponding to the time point from the first segment.

Optionally, the apparatus may further include: a clustering module, configured to acquire a plurality of clusters by clustering the subtitle positions in the plurality of video frames; and a deleting module, configured to delete, from the subtitle positions in the plurality of video frames, subtitle positions that do not belong to any one of the clusters.

Optionally, the acquiring module 601 may be further configured to acquire a first sample image and characters. The apparatus may further include a sample generating module, configured to generate a second sample image based on the first sample image and the characters, wherein the second sample image contains subtitles; and a model training module, configured to acquire the subtitle detection model by training a model by using the second sample image.

Optionally, the selecting module 604 may be configured to perform at least one of: acquiring a face position score based on the face position in the first segment and selecting the second segment based on the face position score, wherein the face position score represents a centering degree of a face position in a video frame; and acquiring a face size score based on the face position in the first segment and selecting the second segment based on the face size score, wherein the face size score represents an appropriateness degree of a face size relative to a size of the video frame.

Optionally, the selecting module 604 may be configured to perform any one of: acquiring a score of the first segment based on the face position score and the face size score and selecting a first segment of which the score is greater than a first threshold as the second segment; selecting a first segment of which the face position score is greater than a second threshold as the second segment; and selecting a first segment of which the face size score is greater than a third threshold as the second segment.

Optionally, the segmenting module 602 may include: a detecting submodule, configured to detect key frames in the video, wherein the key frame is a video frame in which a shot change occurs; and a segmenting submodule, configured to acquire the plurality of first segments by segmenting the video using the key frames as segmentation points.

Optionally, the detecting submodule may be configured to acquire a color histogram of each of a plurality of video frames of the video; classify the plurality of video frames into a plurality of types based on the color histogram of each of the plurality of video frames, wherein a difference between color histograms of any two video frames of a same type is less than a preset threshold; and select a first frame of each type in the plurality of types as a key frame corresponding to the type.

Optionally, the detecting submodule may be configured to acquire a first histogram of a first region in the video frame, wherein the first region is a region in a center of a view field of the video frame; acquire a second histogram of a second region in the video frame, wherein the second region is a region at an edge of the view field of the video frame; and acquire the color histogram by performing weighted average on the first histogram and the second histogram based on a first weight of the first region and a second weight of the second region, wherein the first weight is greater than the second weight.

Optionally, the apparatus may further include the deleting module, configured to delete a border of the video based on the boundary value.

Optionally, the acquiring module 601 may be specifically configured to traverse any video frame of the video from a center of the video frame to a periphery of the video frame; and in response to value differences between different pixels in any currently traversed row falling within a preset range, determine the row as an upper or lower boundary of the content of the video frame; and/or in response to value differences between different pixels in any currently traversed column falling within the preset range, determine the column as a left or right boundary of the content of the video frame.

Optionally, the acquiring module 601 may include: an acquiring submodule, configured to acquire boundary values of content of the plurality of video frames of the video; a clustering submodule, configured to acquire a plurality of clusters by clustering the boundary values of the content of the plurality of video frames; and a deleting submodule, configured to delete, from the boundary values of the content of the plurality of video frames, boundary values that do not belong to any cluster.

It should be noted that when the apparatus for extracting a video segment provided in the foregoing embodiments extracts video segments, the division of the foregoing functional modules is merely used as an example. In practical applications, the foregoing functions may be allocated to and completed by different function modules as required, that is, an internal structure of the apparatus is divided into different functional modules to complete all or some of the foregoing functions. In addition, the apparatus for extracting the video segment provided in the foregoing embodiments belongs to the same concept as the method for extracting the video segment. For a specific implementation process, refer to the method embodiments. Details are not described herein.

Figure 7:
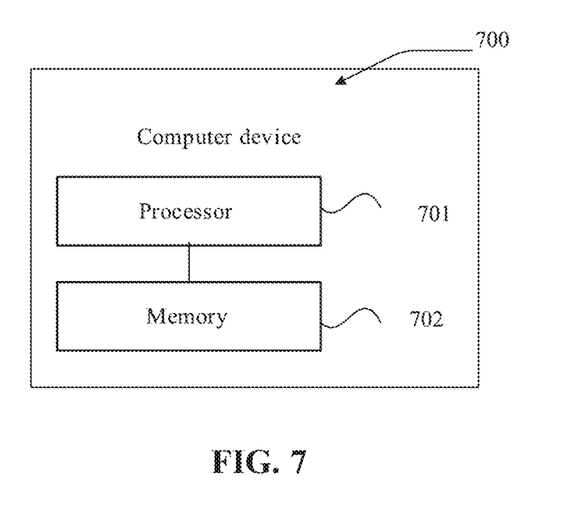
FIG. 7 is a schematic structural diagram of a computer device according to some embodiments of the present application.

FIG. 7 is a schematic structural diagram of a computer device according to some embodiments of the present application. The computer device 700 may vary greatly due to different configurations or performance and may include one or more processors (CPUs) 701 and one or more memories 702. The one or more memories 702 store at least one instruction. The at least one instruction is loaded and executed by the one or more processors 701 to implement the foregoing method for extracting the video segment. The computer device may further include components such as a wired or wireless network interface, a keyboard, and an input/output interface, for input and output. The computer device may further include other components for implementing the functions of the device. Details are not described herein.

In an exemplary embodiment, a computer-readable storage medium, such as a memory storing at least one instruction, may be further provided. The at least one instruction, when loaded and executed by a processor, causes the processor to perform the method for extracting the video segment in the foregoing embodiments. For example, the computer-readable storage medium may be a read-only memory (ROM), a random-access memory (RAM), a compact disc ROM (CD-ROM), a magnetic tape, a floppy disk, an optical data storage device, or the like.

Those of ordinary skill in the art can understand that all or some of the steps in the foregoing embodiments may be implemented by hardware, or by instructing related hardware by using a program. The program may be stored in a computer-readable storage medium. The storage medium may be an ROM, a disk, a CD, or the like.

The foregoing descriptions are merely preferred embodiments of the present application and are not intended to limit the present application. Any modification, equivalent replacement, and improvement within the spirit and principle of the present application shall be included within the protection scope of the present application.

What is claimed is:

1. A method for extracting a video segment, comprising:
   acquiring a boundary value of content of a video, wherein the boundary value comprises an upper boundary, a lower boundary, a left boundary, and a right boundary;
   acquiring a plurality of first segments by performing key frame segmentation on the video;
   detecting an upper boundary of subtitles in each of the plurality of first segments;
   detecting a face position in each of the plurality of first segments;
   selecting, from the plurality of first segments, a second segment in which the face position satisfies a preset condition; and
   acquiring a third segment without subtitles by cropping the second segment based on an upper boundary of subtitles in the second segment.

2. The method according to claim 1, wherein detecting the upper boundary of the subtitles in each of the plurality of first segments comprises:
   extracting a plurality of video frames from each of the plurality of first segments;
   acquiring subtitle positions in the plurality of video frames by inputting the plurality of video frames into a subtitle detection model, wherein the subtitle detection model is configured to detect a subtitle position in a video frame; and
   acquiring the upper boundary of the subtitles in the first segment based on the subtitle positions in the plurality of video frames.

3. The method according to claim 2, wherein extracting the plurality of video frames from each of the plurality of first segments comprises:
   acquiring a time point of each line of lyrics in the video from a lyric file of the video; and
   extracting a video frame corresponding to the time point from the first segment.

4. The method according to claim 2, wherein upon acquiring the subtitle positions in the plurality of video frames by inputting the plurality of video frames into the subtitle detection model, the method further comprises:
   acquiring a plurality of clusters by clustering the subtitle positions in the plurality of video frames; and
   deleting, from the subtitle positions in the plurality of video frames, subtitle positions that do not belong to any one of the clusters.

5. The method according to claim 2, wherein prior to acquiring the subtitle positions in the plurality of video frames by inputting the plurality of video frames into the subtitle detection model, the method further comprises:
   acquiring a first sample image and characters;
   generating a second sample image based on the first sample image and the characters, wherein the second sample image contains subtitles; and
   acquiring the subtitle detection model by training a model by using the second sample image.

6. The method according to claim 1, wherein selecting, from the plurality of first segments, the second segment in which the face position satisfies the preset condition comprises at least one of:
   acquiring a face position score based on the face position in the first segment and selecting the second segment based on the face position score, wherein the face position score represents a centering degree of a face position in a video frame; or
   acquiring a face size score based on the face position in the first segment and selecting the second segment based on the face size score, wherein the face size score represents an appropriateness degree of a face size relative to a size of the video frame.

7. The method according to claim 6, wherein selecting, from the plurality of first segments, the second segment in which the face position satisfies the preset condition comprises any one of:
   acquiring a score of the first segment based on the face position score and the face size score and selecting a first segment of which the score is greater than a first threshold as the second segment;
   selecting a first segment of which the face position score is greater than a second threshold as the second segment; and
   selecting a first segment of which the face size score is greater than a third threshold as the second segment.

8. The method according to claim 1, wherein acquiring the plurality of first segments by performing the key frame segmentation on the video comprises:
   detecting key frames in the video, wherein the key frame is a video frame in which a shot change occurs; and
   acquiring the plurality of first segments by segmenting the video using the key frames as segmentation points.

9. The method according to claim 8, wherein detecting the key frames of the video comprises:
   acquiring a color histogram of each of a plurality of video frames of the video;
   classifying the plurality of video frames into a plurality of types based on the color histogram of each of the plurality of video frames, wherein a difference between color histograms of any two video frames of a same type is less than a preset threshold; and
   selecting a first frame of each type in the plurality of types as a key frame corresponding to the type.

10. The method according to claim 9, wherein acquiring the color histogram of each of the plurality of video frames of the video comprises:
    acquiring a first histogram of a first region in the video frame, wherein the first region is a region in a center of a view field of the video frame;
    acquiring a second histogram of a second region in the video frame, wherein the second region is a region at an edge of the view field of the video frame; and
    acquiring the color histogram by performing weighted average on the first histogram and the second histogram based on a first weight of the first region and a second weight of the second region, wherein the first weight is greater than the second weight.

11. The method according to claim 1, wherein prior to performing the key frame segmentation on the video, the method further comprises:
    deleting a border of the video based on the boundary value.

12. The method according to claim 1, wherein acquiring the boundary value of the content of the video comprises:

traversing any video frame of the video from a center of the video frame to a periphery of the video frame; and in response to value differences between different pixels in any currently traversed row falling within a preset range, determining the row as an upper or lower boundary of the content of the video frame; and/or in response to value differences between different pixels in any currently traversed column falling within the preset range, determining the column as a left or right boundary of the content of the video frame.

13. The method according to claim 1, wherein acquiring the boundary value of the content of the video comprises:

acquiring boundary values of content of a plurality of video frames of the video;

acquiring a plurality of clusters by clustering the boundary values of the content of the plurality of video frames; and deleting, from the boundary values of the content of the plurality of video frames, boundary values that do not belong to any cluster.

14. A computer device, comprising at least one processor and at least one memory storing at least one instruction, wherein the at least one processor, when loading and executing the at least one instruction, is caused to perform:

acquiring a boundary value of content of a video, wherein the boundary value comprises an upper boundary, a lower boundary, a left boundary, and a right boundary;

acquiring a plurality of first segments by performing key frame segmentation on the video;

detecting an upper boundary of subtitles in each of the plurality of first segments;

detecting a face position in each of the plurality of first segments;

selecting, from the plurality of first segments, a second segment in which the face position satisfies a preset condition; and acquiring a third segment without subtitles by cropping the second segment based on an upper boundary of subtitles in the second segment.

15. The computer device according to claim 14, wherein the at least one processor, when loading and executing the at least one instruction, is caused to perform:

extracting a plurality of video frames from each of the plurality of first segments;

acquiring subtitle positions in the plurality of video frames by inputting the plurality of video frames into a subtitle detection model, wherein the subtitle detection model is configured to detect a subtitle position in a video frame; and acquiring the upper boundary of the subtitles in the first segment based on the subtitle positions in the plurality of video frames.

16. The computer device according to claim 14, wherein the at least one processor, when loading and executing the at least one instruction, is caused to perform at least one of:

acquiring a face position score based on the face position in the first segment and selecting the second segment based on the face position score, wherein the face position score represents a centering degree of a face position in a video frame; or acquiring a face size score based on the face position in the first segment and selecting the second segment based on the face size score, wherein the face size score represents an appropriateness degree of a face size relative to a size of the video frame.

17. The computer device according to claim 14, wherein the at least one processor, when loading and executing the at least one instruction, is caused to perform:

detecting key frames in the video, wherein the key frame is a video frame in which a shot change occurs; and acquiring the plurality of first segments by segmenting the video using the key frames as segmentation points.

18. The computer device according to claim 14, wherein the at least one processor, when loading and executing the at least one instruction, is caused to perform:

deleting a border of the video based on the boundary value.

19. The computer device according to claim 14, wherein the at least one processor, when loading and executing the at least one instruction, is caused to perform:

traversing any video frame of the video from a center of the video frame to a periphery of the video frame; and in response to value differences between different pixels in any currently traversed row falling within a preset range, determining the row as an upper or lower boundary of the content of the video frame; and/or in response to value differences between different pixels in any currently traversed column falling within the preset range, determining the column as a left or right boundary of the content of the video frame.

20. A non-transitory computer-readable storage medium storing at least one instruction, wherein the at least one instruction, when loaded and executed by a processor, causes the processor to perform:

acquiring a boundary value of content of a video, wherein the boundary value comprises an upper boundary, a lower boundary, a left boundary, and a right boundary;

acquiring a plurality of first segments by performing key frame segmentation on the video;

detecting an upper boundary of subtitles in each of the plurality of first segments;

detecting a face position in each of the plurality of first segments;

selecting, from the plurality of first segments, a second segment in which the face position satisfies a preset condition; and acquiring a third segment without subtitles by cropping the second segment based on an upper boundary of subtitles in the second segment.

* * * * *